United States Patent [19]
Morisaki

[11] Patent Number: 5,365,580
[45] Date of Patent: Nov. 15, 1994

[54] SYSTEM AND METHOD OF DETECTING UNAUTHORIZED USE OF IDENTIFIERS

[75] Inventor: Tetsuya Morisaki, Kawasaki, Japan

[73] Assignee: Fujitsu Limited, Kawasaki, Japan

[21] Appl. No.: 968,873

[22] Filed: Oct. 30, 1992

[30] Foreign Application Priority Data

Nov. 7, 1991 [JP] Japan ................. 3-291077

[51] Int. Cl.5 .............................. H04M 1/66
[52] U.S. Cl. ....................... 379/189; 379/93; 379/188; 379/95
[58] Field of Search ......... 379/95, 93, 188, 189, 379/196, 197, 245, 246; 340/825.31, 825.32

[56] References Cited

U.S. PATENT DOCUMENTS

| | | | |
|---|---|---|---|
| 4,531,023 | 7/1985 | Levine | 179/2 |
| 4,815,031 | 3/1989 | Furukawa | 364/900 |
| 5,003,595 | 3/1991 | Collins et al. | 379/95 |

FOREIGN PATENT DOCUMENTS

| | | | |
|---|---|---|---|
| 62-53063 | 3/1987 | Japan . | |
| 3238945 | 10/1991 | Japan | 379/189 |

OTHER PUBLICATIONS

Smith, J.; "Callback security system prevents unauthorized computer access"; Mini–Micro Systems (Jul. 1984).

European Search Report dated Mar. 8, 1993.

IBM Technical Disclosure vol. 30 No. 3 Aug. 1987, "Location Identification to Prevent Unauthorized, User-Implimented, Dial-in Ports To Computers", pp. 1047–1050.

*Primary Examiner*—James L. Dwyer
*Assistant Examiner*—D. S. Hunter
*Attorney, Agent, or Firm*—Nikaido, Marmelstein, Murray & Oram

[57] ABSTRACT

A system detects unauthorized use of an identifier in a communication system which includes at least one terminal coupled to a communication center via a communication network. The system includes a first part provided in the communication center for managing a password and a previous caller telephone number in correspondence with each identifier, and a second part provided in the communication center for sending a warning message to the terminal if an access identifier and an access password input from the terminal from which an access request is made respectively match one of the identifiers and a corresponding password managed by the first means but a present caller telephone number from which the access request is made is different from the previous caller telephone number.

22 Claims, 9 Drawing Sheets

FIG.3 PRIOR ART

| ACCESS ID | PASSWORD | PREVIOUS ACCESS DATE & TIME | | | |
|---|---|---|---|---|---|
| ABCDEF | 01992 | 1991, 5. 1. AM 10:30 | | | |
| XYZXYZ | 012334 | | | | |
| --- | --- | | | | |

| ACCESS ID | PREVIOUS CALLER TEL. NO. | PASSWORD, PREVIOUS ACCESS DATE & TIME, ETC. | | | |
|---|---|---|---|---|---|
| ABCDEF | 123456 7890 | | | | |
| XYZXYZ | 000000 0000 | | | | |
| --- | | | | | |

| ACCESS ID | PREVIOUS CALLER TEL. NO. | 1ST & 2ND PASSWORDS PW1 & PW2, PREVIOUS ACCESS DATE & TIME, ETC. |
|---|---|---|
| ABCDEF | 1234567890 | |
| XYZXYZ | 0000000000 | |
| --- | | |
| | | |

1b

SYSTEM AND METHOD OF DETECTING UNAUTHORIZED USE OF IDENTIFIERS

BACKGROUND OF THE INVENTION

The present invention generally relates to systems and methods of detecting unauthorized use of identifiers, and more particularly to a system and a method which enable simple detection of unauthorized use of an identifier so as to improve the system security.

Communications using personal computers have become popular, and such communications are no longer limited to the computer industry but are also used at homes. For this reason, there are demands to improve the security of the system. The management of the identifiers (hereinafter simply referred to as IDs) which are required to allow access to the system is particularly important, and there are demands to prevent unauthorized use of the IDs and to effectively detect the unauthorized use of the IDs.

FIG. 1 shows an example of a conventional system for detecting unauthorized use of the ID. In FIG. 1, a personal terminal 2 is coupled to a communication center 1 via a public communication network 4 and a switching system 3. The personal terminal 2 is provided with a communication function and may be a personal computer, a word processor or the like. On the other hand, the communication center 1 includes an unauthorized use checking program 1A shown in FIG. 2, and a management table 1B having a format shown in FIG. 3.

The communication center 1 carries out a registration service in response to an access request from the personal terminal 2, and an ID and a password are stored in the management table 1B in the format shown in FIG. 3. The management table 1B stores the previous access date and time in addition to the ID and the password.

Accordingly, as shown in FIG. 2, a step 100 searches for an ID in the management table 1B which is identical to the ID input with the access request (hereinafter simply referred to as the access ID), and a step 102 decides whether or not the access ID matches an ID in the management table 1B. If the decision result in the step 101 is YES, a step 102 decides whether or not the password input with the access request (hereinafter simply referred to as the access password) matches the password stored in the management table 1B in correspondence with the above ID which matches the access ID.

If the decision result in the step 101 or 102 is NO, it is regarded that the user making the access request is a non-registered user or an unauthorized user, and a step 103 rejects the access request.

On the other hand, if the decision result in the step 102 is YES, a step 104 carries out the communication process.

Conventionally, when the access ends, the communication center 1 refers to a timer (not shown) and records the access date and time into the management table 1B within a memory (not shown). Thereafter, if the decision results in the steps 101 and 102 are both YES for a subsequent access request, the communication center 1 refers to the management table 1B and notifies the previous access date and time to the personal terminal 2.

Accordingly, when the authorized user makes an access to the communication center 1 from the personal terminal 2, it is possible to recognize whether or not an unauthorized use of this user's ID has been made by checking the previous access date and time which are received from the communication center 1 at the start of the communication process. However, the communication center 1 notifies the personal terminal 2 of only the previous access date and time. For this reason, there were problems in that it is impossible to specify the unauthorized user who has made the unauthorized access, and that the information supplied to the authorized user is insufficient to more completely check the unauthorized use of the ID.

SUMMARY OF THE INVENTION

Accordingly, it is a general object of the present invention to provide a novel and useful system and method of preventing unauthorized use of identifier, in which the problems described above are eliminated.

Another and more specific object of the present invention is to provide a system for detecting unauthorized use of an identifier in a communication system which includes at least one terminal coupled to a communication center via a communication network, comprising first means, provided in the communication center, for managing a password and a previous caller telephone number in correspondence with each identifier, and second means, provided in the communication center, for sending a warning message to the terminal if an access identifier and an access password input from the terminal from which an access request is made respectively match one of the identifiers and a corresponding password managed by the first means but a present caller telephone number from which the access request is made is different from the previous caller telephone number. According to the system of the present invention, it is possible to notify the terminal user if the present caller telephone number is different from the previous caller telephone number. Thus, an unauthorized use of the identifier can be detected by the terminal user if the terminal user did not make the previous access from a different telephone number. Furthermore, if the previous telephone number is notified to the terminal user, it is possible to locate the unauthorized user from the previous telephone number.

Still another object of the present invention is to provide the system described above wherein the first means further manages second passwords in correspondence with each identifier, and the second means requests input of a second access password to the terminal when sending the warning message, and rejects the access request if the second access password input from the terminal is different from a corresponding second password managed by the first means. According to the system of the present invention, it is possible to reject the access request if the second access password is incorrect. This access request rejecting function is particularly useful when the user makes the access request from different telephone numbers.

A further object of the present invention is to provide a method of detecting unauthorized use of an identifier in a communication system which includes at least one terminal coupled to a communication center via a communication network, comprising the steps of (a) managing a password and a previous caller telephone number in correspondence with each identifier, and (b) sending a warning message to the terminal if an access identifier and an access password input from the terminal from which an access request is made respectively match one of the identifiers and a corresponding password managed by the step (a) but a present caller telephone number from which the access request is made is different from the previous caller telephone number. According to the method of the present invention, it is possible to notify the terminal user if the present caller telephone number is different from the previous caller telephone number. Thus, an authorized use of the identifier can be detected by the terminal user if the terminal user did not make the previous access from a different telephone number. Furthermore, if the previous telephone number is notified to the terminal user, it is possible to locate the unauthorized user from the previous telephone number.

Another object of the present invention is to provide the method described above wherein the step (a) further manages second passwords in correspondence with each identifier, and the step (b) requests input of a second access password to the terminal when sending the warning message, and rejects the access request if the second access password input from the terminal is different from a corresponding second password managed by the step (a). According to the method of the present invention, it is possible to reject the access request if the second access password is incorrect. This access request rejecting function is particularly useful when the user makes the access request from different telephone numbers.

Other objects and further features of the present invention will be apparent from the following detailed description when read in conjunction with the accompanying drawings.

BRIEF DESCRIPTION OF THE DRAWINGS

FIG. 3 shows an example of the format of a management table of the communication center shown in FIG. 1;

FIG. 5 shows an embodiment of the format of a management table of a communication center in the first embodiment;

FIG. 8 shows an embodiment of the format of a management table of a communication center in a second embodiment of the system for detecting unauthorized use of an ID according to the present invention.

DESCRIPTION OF THE PREFERRED EMBODIMENTS

Figure 1:
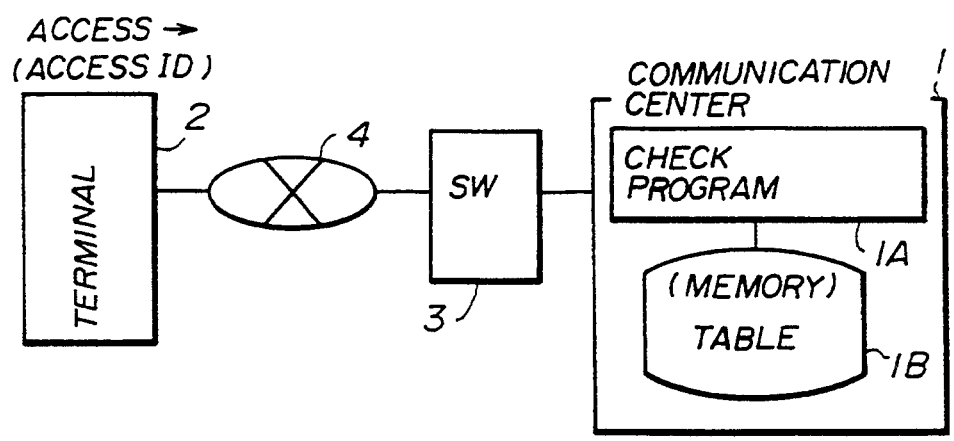
FIG. 1 is a system block diagram showing an example of a conventional system for detecting unauthorized use of ID.
Figure 2:
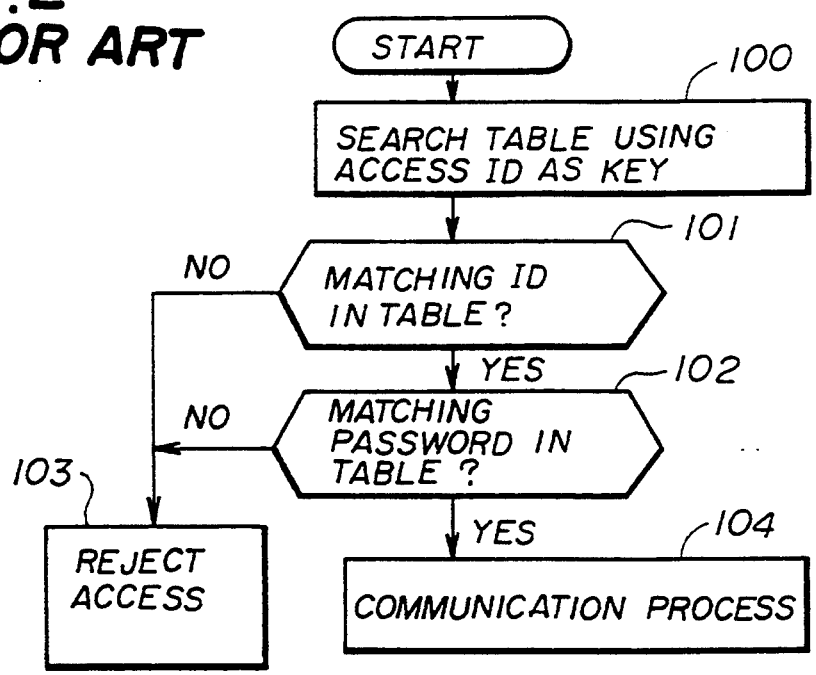
FIG. 2 is a flow chart for explaining an unauthorized use checking program of a communication center shown in FIG. 1.
Figure 4:
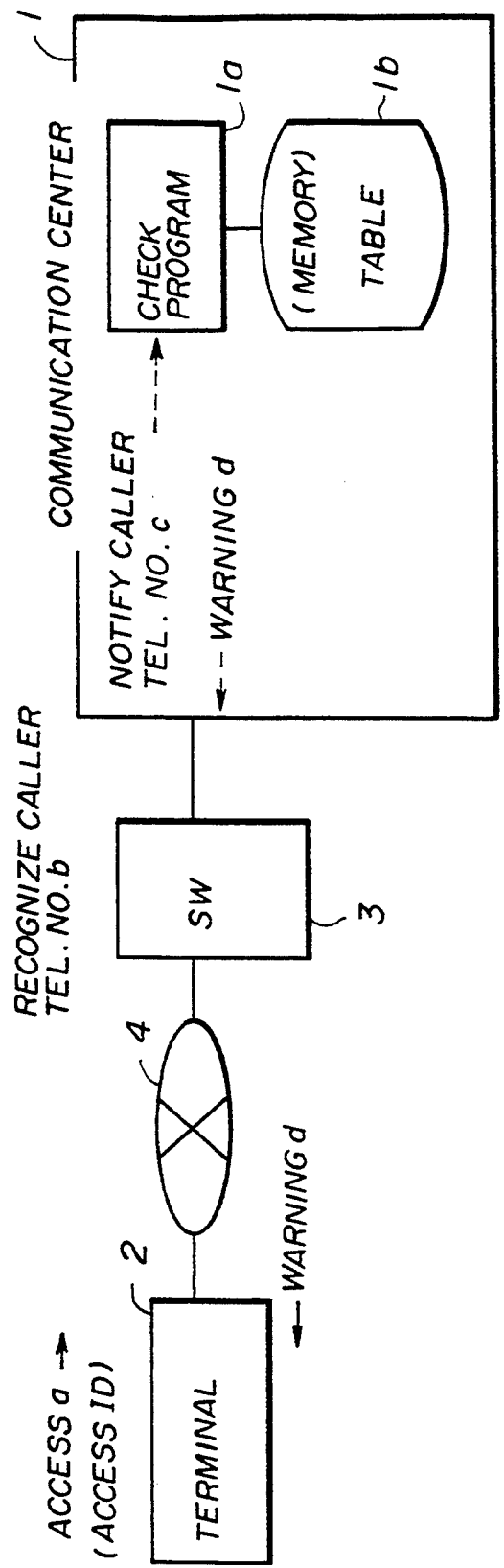
FIG. 4 is a system block diagram showing a first embodiment of an a system for detecting unauthorized use of ID according to the present invention.
Figure 6:
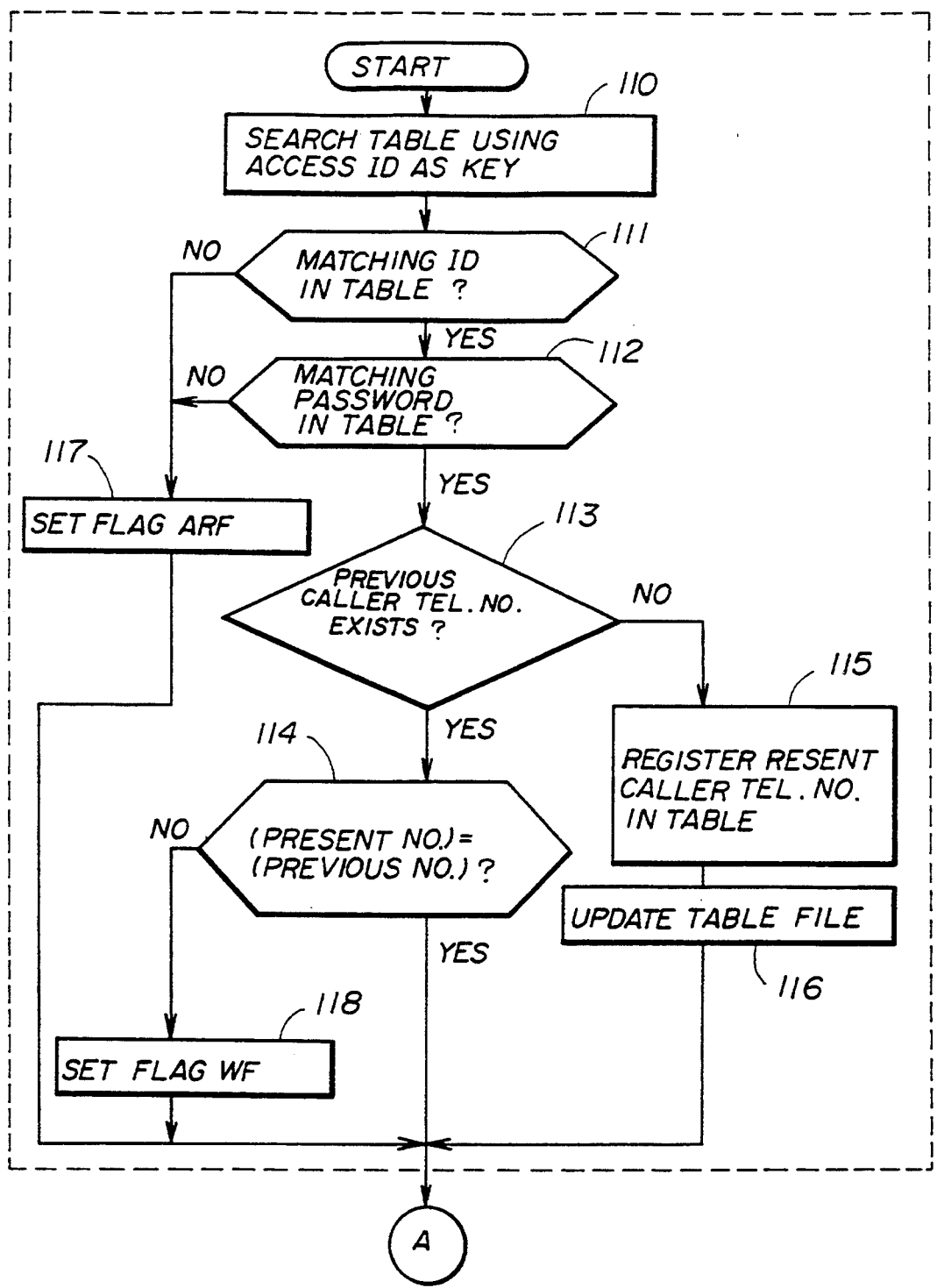
FIGS. 6 and 7 respectively are flow charts for explaining the operation of the first embodiment.
Figure 7:
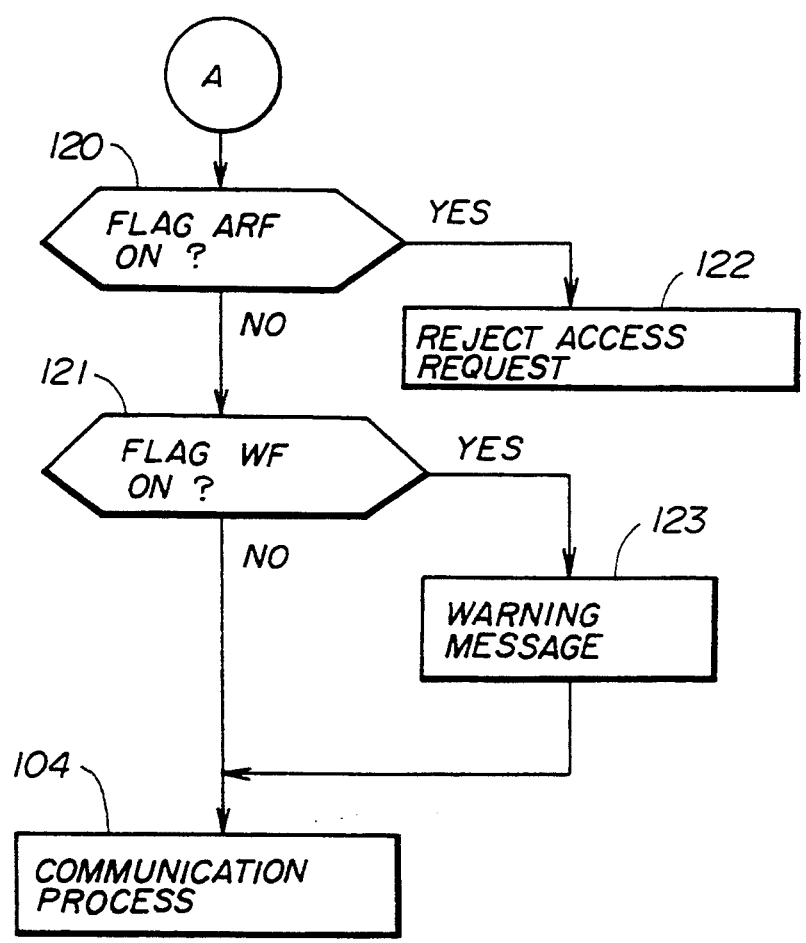

FIG. 4 shows a first embodiment of a system for detecting unauthorized use of ID according to the present invention. In FIG. 4, those parts which are the same as those corresponding parts in FIG. 1 are designated by the same reference numerals, and a description thereof will be omitted. FIG. 5 shows an embodiment of the format of a management table 1b of the communication center 1 in the first embodiment. FIGS. 6 and 7 respectively are flow charts for explaining the operation of the first embodiment, that is, a first embodiment of a method of detecting unauthorized use of ID according to the present invention.

In this embodiment of the system, the password, the previous access date and time and the previous caller telephone number are recorded in the management table 1b of the communication center 1 in correspondence with the access ID of an access request a made from the personal terminal 2. When a next access request a is made, a recognition b is made of the present caller telephone number, and a comparison is made between the present caller telephone number and the previous caller telephone number in an unauthorized use checking program 1a of the communication center 1 based on a notification c of the present caller telephone number. If the two compared telephone numbers do not match, a warning d is made to the personal terminal 2. When making this warning d, the previous caller telephone number may be transmitted to the personal terminal 2 together with the warning.

The communication center 1 has a known construction including a processor and a memory or storage coupled thereto. The processor carries out the unauthorized use checking program 1a which is stored in the memory. This memory also stores the management table 1b. In FIG. 4, only the unauthorized use checking program 1a and the management table 1b are shown within the communication center 1 for the sake of convenience.

As shown in FIG. 6, a step 110 searches for an ID in the management table 1b which is identical to the access ID input with the access request a, by using the access ID as the key. A step 111 decides whether or not the access ID matches an ID in the management table 1b. If the decision result in the step 111 is YES, a step 112 decides whether or not the access password input with the access request a matches the password stored in the management table 1b in correspondence with the above ID which matches the access ID.

If the decision result in the step 111 or 112 is NO, it is regarded that the user making the access request is a non-registered user or an unauthorized user, and a step 117 sets an access reject flag ARF. The process advances to a step 120 shown in FIG. 7 after the step 117.

On the other hand, if the decision result in the step 112 is YES, a step 113 decides whether or not a previous caller telephone number is stored in the column of the management table 1b corresponding to the access ID. For example, if the number stored in this column of the management table 1b consists of all "0"s, for example, the decision result in the step 113 is NO and a step 115 registers the present caller telephone number in the management table 1b. For example, the present caller telephone number is "1234567890" for the access ID "ABCDEF" as shown in FIG. 5. Then, a step 116 updates the file of the management table 1b in the communication center 1, and the process advances to the step 120 shown in FIG. 7.

On the other hand, if the decision result in the step 113 is YES, it means that an access was previously made using the same access ID. In this case, a step 114 decides whether or not the present caller telephone number matches the previous caller telephone number stored in the management table 1b. If the decision result in the step 114 is YES, the present access request a is regarded as a normal access and the process advances to the step 120 shown in FIG. 7. But if the decision result in the step 114 is NO, a step 118 sets a warning flag WF before advancing to the step 120 shown in FIG. 7.

When the warning flag WF is set, it means that the present caller telephone number is different from the previous caller telephone number. If the user making the present access request a is an authorized user, this user can recognize whether or not an unauthorized use of his ID has been made.

The step 120 shown in FIG. 7 decides whether or not the access reject flag ARF is set. If the decision result in the step 120 is YES, a step 122 rejects the access request a. On the other hand, if the decision result in the step 120 is NO, a step 121 decides whether or not the warning flag WF is set. If the decision result in the step 121 is NO, a step 104 carries out the communication process.

If the decision result in the step 121 is YES, a step 123 sends a warning message to the personal terminal 2, and a step 104 sends the previous access date and time to the personal terminal 2 at the start of the communication process. Of course, the step 104 may also send the previous caller telephone number to the personal terminal 2. The information received from the communication center 1 is displayed on a display of the personal terminal 2, for example.

The authorized user of the personal terminal 2 can recognize from the displayed previous access date and time whether or not the unauthorized use of his ID has occurred, because the authorized user would know the previous access date and time. In addition, if the previous caller telephone number is displayed, it will facilitate the authorized user recognizing whether or not the unauthorized use of his ID has occurred. Further, the authorized user will be able to know from the previous caller telephone number the telephone number of the unauthorized user who has made the unauthorized access to the system.

In this embodiment, the previous access date and time are sent to the personal terminal after the warning message. However, it is possible to send only the warning message, or to send the warning message and the previous access date and time or the previous caller telephone number. The important thing is to notify the authorized user of the warning message which indicates that the present caller telephone number and the previous caller telephone number do not match.

Figure 9:
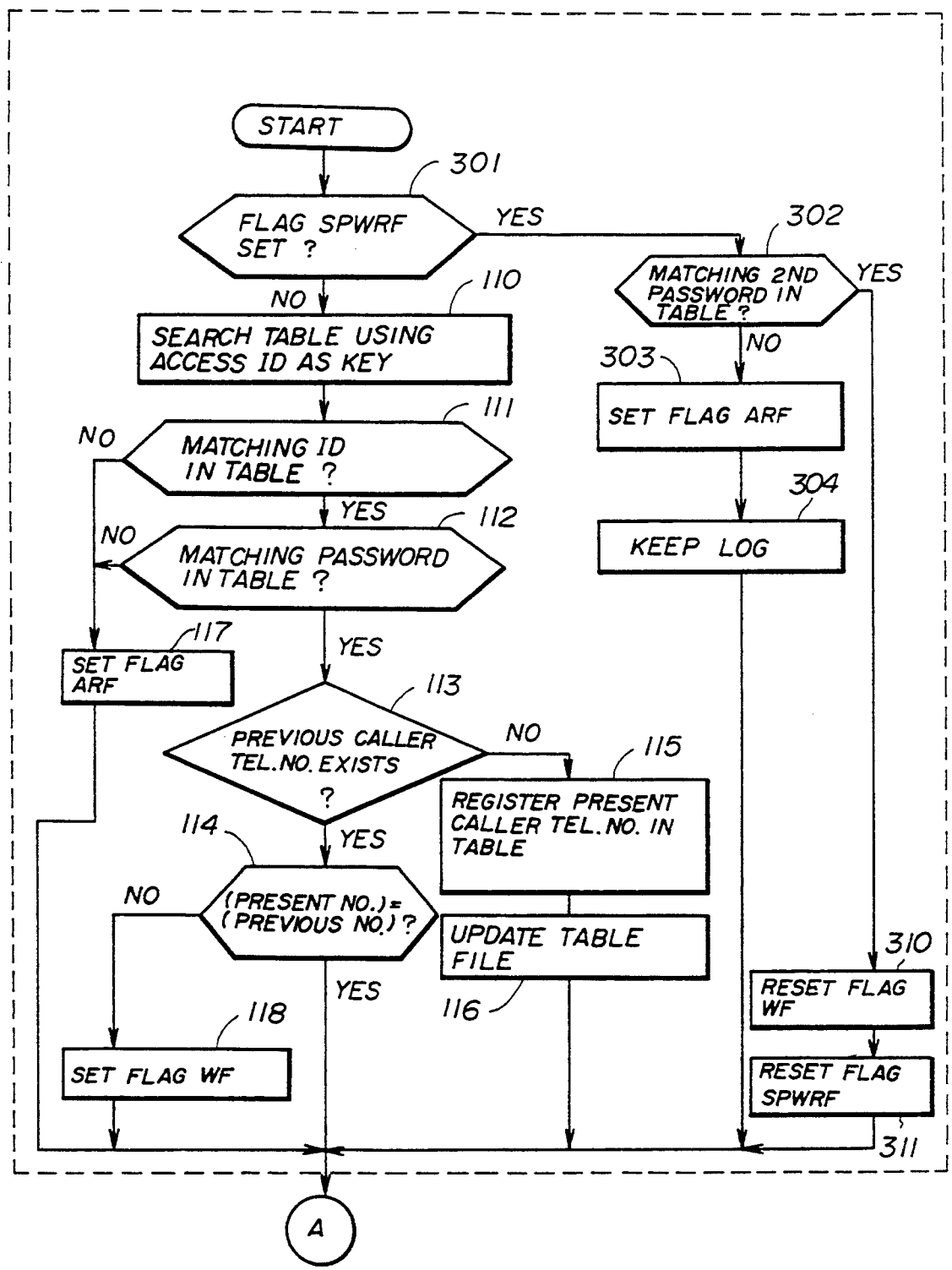
FIGS.9 and 10 respectively are flow charts for explaining the operation of the second embodiment.
Figure 10:
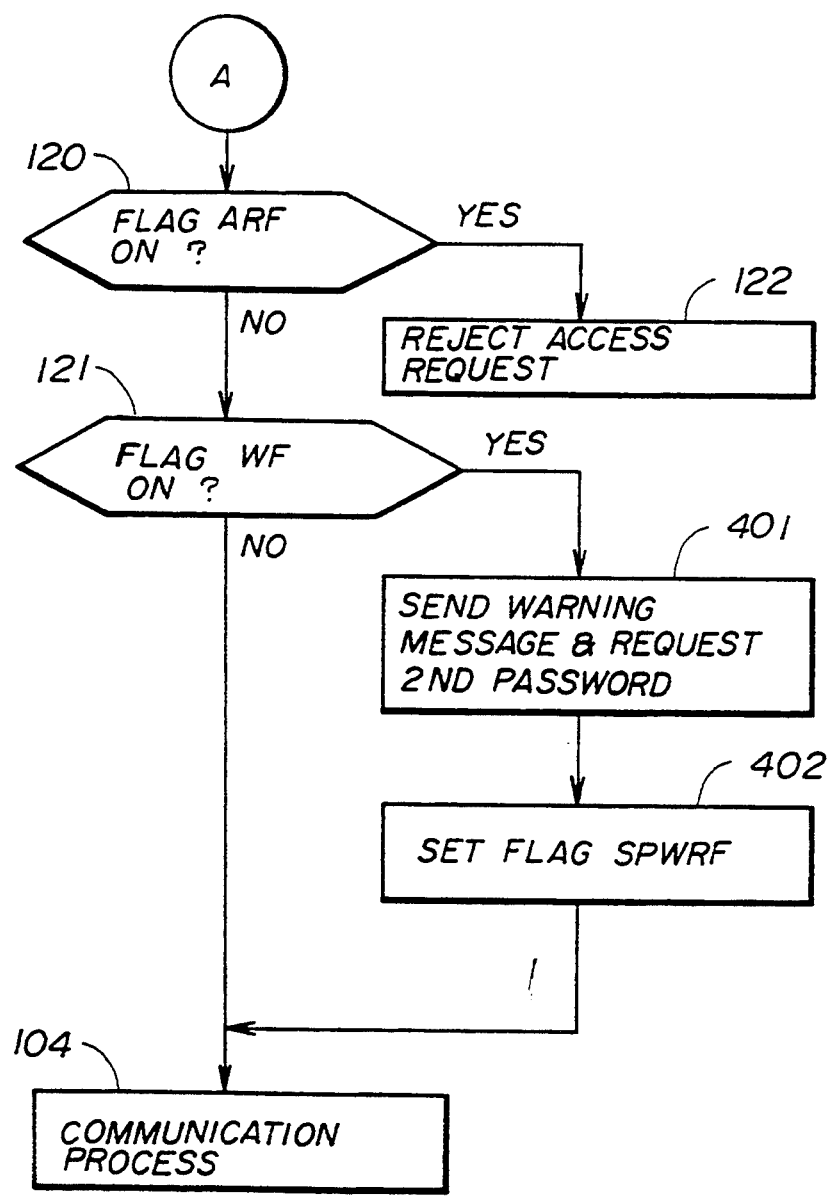

Next, a description will be given of a second embodiment of the system for detecting unauthorized use of an ID according to the present invention. The block system of this embodiment is identical to that shown in FIG. 4. FIG. 8 shows an embodiment of the format of a management table 1b of the communication center 1 in the second embodiment. FIGS. 9 and 10 respectively are flow charts for explaining the operation of the second embodiment, that is, a second embodiment of the method of detecting unauthorized use of an ID according to the present invention. In FIGS. 9 and 10, those steps which are the same as those corresponding steps in FIGS. 6 and 7 are designated by the same reference numerals, and a description thereof will be omitted.

In this embodiment of the system, two passwords are used, so as to further improve the system security compared to the first embodiment.

As shown in FIG. 9, a step 301 decides whether or not a second password request flag SPWRF is set. Initially, prior to checking the access ID and the first password in the steps 111 and 112, the second password request flag is reset. Hence, the decision result in the step 301 is NO and the steps 110 through 118 described above are carried out.

On the other hand, after the step 118, the decision result in the step 121 shown in FIG. 10 is YES, and a step 401 is carried out. The step 401 sends the warning message to the personal terminal 2 as in the case of the step 123 of the first embodiment, and in addition, sends a message requesting the user of the personal terminal 2 to input a second password. Then, a step 402 sets the second password request flag SPWRF, and the process advances to the step 104.

When the user of the personal terminal 2 is notified of the warning message and inputs the second password in response to the request from the communication center 1, the decision result in the step 301 becomes YES, and a step 302 decides whether or not the input second password matches a second password which is stored in the management table 1b in correspondence with the access ID. In this case, the management table 1b stores first and second passwords PW1 and PW2 in correspondence with each access ID as shown in FIG. 8. Otherwise, the management table 1b shown in FIG. 8 is basically the same as that shown in FIG. 5.

If the decision result in the step 302 is NO, a step 303 sets the access reject flag ARF. Further, a step 304 keeps a log of the information related to this rejected access request. The information kept in the log may include the access ID, the caller telephone number of the rejected access request, the date and time of the rejected access request and the like. By keeping such information in the log of the communication center 1, it is possible to confirm unauthorized accesses reported from authorized users. In addition, even if the step 104 in FIG. 10 does not send the previous caller telephone number to the personal terminal 2 for privacy reasons and to prevent an unauthorized user from knowing the telephone number of the authorized user, the unauthorized user can still be located from the previous caller telephone number which is in the log at the communication center 1. Therefore, the system security is improved by the use of two passwords and the log which is stored in the communication center 1. This log, the unauthorized use checking program 1a and the management table 1b may be stored in the memory or storage within the communication center 1.

On the other hand, if the decision result in the step 302 is YES in FIG. 9, it is regarded that the present caller from the personal terminal 2 is the authorized user. Hence, in this case, a step 310 resets the warning flag WF and a step 311 resets the second password request flag SPWRF before advancing to the step 120 shown in FIG. 10.

In the present invention, the communication center 1 needs to know the telephone number of the caller who makes the access request from the personal terminal 2. For example, if a telephone switching system employing the known multiple frequency signal (MF) system or an electronic switching system employing the interoffice communication system (for example, the system using the common channel signaling, No. 7 signaling system specifications of the CCITT) is used, the caller telephone number can be recognized at the called side switching system 3 by transferring the caller telephone number from the calling side switching system to the called side switching system 3 based on the request from the called side switching system 3 using the multiple frequency signal or the common channel signaling. Hence, the communication center 1 can easily know the caller telephone number by requesting the caller telephone number of the personal terminal 2 from which the access request is made to the switching system 3 which is connected to the communication center 1.

However, in the case where the public communication network 4 shown in FIG. 4 is a telephone network which does not have the above described function of receiving the caller telephone number, the communication center 1 cannot know the caller telephone number from the switching system 3. But in this case, it is possible to send the caller telephone number together with the access request when making the access from the personal terminal 2. The method of recognizing the caller telephone number at the communication center 1 is not limited to a specific method, and any method may be employed as long as the caller telephone number can be recognized at the communication center 1.

In the described embodiments, it is assumed for the sake of convenience that a communication is made between two personal terminals 2 via the communication center 1. However, the present invention is not limited to the communication between personal computers, and is applicable to any kind of communication which is made between two terminals having a communication function via a communication center which controls the communication, where the terminals are connected to a communication network having the function of transferring the caller telephone number from the caller side to the called side. Moreover, the communication may be made between one terminal 2 and the communication center 1 if this one terminal 2 is used to simply make access to data stored in the communication center 1 such as a database.

Further, the present invention is not limited to these embodiments, but various variations and modifications may be made without departing from the scope of the present invention.

What is claimed is:

1. A system for detecting unauthorized use of an identifier in a communication system which includes at least one terminal coupled to a communication center via a communication network, said system comprising:
    first means, provided in the communication center, for managing a password and a previous caller telephone number in correspondence with said identifier, said previous caller telephone number being variable dependent upon a location of a last attempted call using said identifier; and
    second means, provided in the communication center, for sending a warning message to the terminal if an access identifier and an access password input from the terminal from which an access request is made respectively match said identifier and a corresponding password managed by said first means but a present caller telephone number from which the access request is made is different from the previous caller telephone number.

2. The system as claimed in claim 1, wherein said second means permits the access request made from the terminal if the access identifier and the access password input from the terminal match said identifier and the corresponding password managed by said first means.

3. The system as claimed in claim 1, wherein said second means recognizes the present caller telephone number from which the access request is made based on a telephone number which is received from the terminal together with the access request.

4. The system as claimed in claim 1, wherein the communication network includes means for notifying a called end of a telephone number of a calling end, and said second means recognizes the present caller telephone number from which the access request is made based on a notification received from the communication network.

5. The system as claimed in claim 1, wherein said first means further manages second password in correspondence with said identifier, and said second means requests input of a second access password to the terminal when sending the warning message, and rejects the access request if the second access password input from the terminal is different from a corresponding second password managed by said first means.

6. The system as claimed in claim 5, wherein said second means recognizes the present caller telephone number from which the access request is made based on a telephone number which is received from the terminal together with the access request.

7. The system as claimed in claim 5, wherein the communication network includes means for notifying a called end of a telephone number of a calling end, and said second means recognizes the present caller telephone number from which the access request is made based on a notification received from the communication network.

8. The system as claimed in claim 5, wherein the communication center is further provided with third means for keeping a log of information related to the access request which is rejected by said second means.

9. The system as claimed in claim 8, wherein said third means stores in the log information including the access identifier used for the rejected access request, the caller telephone number of the rejected access request, and the date and time of the rejected access request.

10. A system for detecting unauthorized use of an identifier in a communication system which includes at least one terminal coupled to a communication center via a communication network, said system comprising:
    first means, provided in the communication center, for managing a password and a previous caller telephone number in correspondence with said identifier; and
    second means, provided in the communication center, for sending a warning message to the terminal if an access identifier and an access password input from the terminal from which an access request is made respectively match said identifier and a corresponding password managed by said first means but a present caller telephone number from which the access request is made is different from the previous caller telephone number, wherein said first means further manages an access date and time of each access, and said second means sends at least one of the previous caller telephone number and the access date and time to the terminal when sending the warning message.

11. A system for detecting unauthorized use of an identifier in a communication system which includes at least one terminal coupled to a communication center via a communication network, said system comprising:
    first means, provided in the communication center, for managing a password and a previous caller telephone number in correspondence with said identifier; and
    second means, provided in the Communication center, for sending a warning message to the terminal if an access identifier and an access password input from the terminal from which an access request is made respectively match said identifier and a corresponding password managed by said first means but a present caller telephone number from which the access request is made is different from the previous caller telephone number;

wherein said first means further manages second passwords in correspondence with each identifier, and said second means requests input of a second access password to the terminal when sending the warning message, and rejects the access request if the second access password input from the terminal is different from a corresponding second password managed by said first means, and wherein said first means further manages an access date and time of each access, and said second means sends at least one of the previous caller telephone number and the access date and time to the terminal when sending the warning message.

12. A method of detecting unauthorized use of an identifier in a communication system which includes at least one terminal coupled to a communication center via a communication network, said method comprising the steps of:

(a) managing a password and a previous caller telephone number in correspondence with said identifier, said previous caller telephone number being variable and dependent upon a location of a last attempted call using said identifier; and (b) sending a warning message to the terminal if an access identifier and an access password input from the terminal from which an access request is made respectively match said identifier and a corresponding password managed by said step (a) but a present caller telephone number from which the access request is made is different from the previous caller telephone number.

13. The method as claimed in claim 12, wherein said step (b) permits the access request made from the terminal if the access identifier and the access password input from the terminal match said identifier and the corresponding password managed by said step (a).

14. The method as claimed in claim 12, wherein said step (b) recognizes the present caller telephone number from which the access request is made based on a telephone number which is received from the terminal together with the access request.

15. The method as claimed in claim 12, wherein the communication network includes means for notifying a called end of a telephone number of a calling end, and said step (b) recognizes the present caller telephone number from which the access request is made based on a notification received from the communication network.

16. The method as claimed in claim 12, wherein said step (a) further manages second password in correspondence with said identifier, and said step (b) requests input of a second access password to the terminal when sending the warning message, and rejects the access request if the second access password input from the terminal is different from a corresponding second password managed by said step (a).

17. The method as claimed in claim 16, wherein said step (b) recognizes the present caller telephone number from which the access request is made based on a telephone number which is received from the terminal together with the access request.

18. The method as claimed in claim 16, wherein the communication network includes means for notifying a called end of a telephone number of a calling end, and said step (b) recognizes the present caller telephone number from which the access request is made based on a notification received from the communication network.

19. The method as claimed in claim 16, which further comprises the step (c) of keeping a log of information related to the access request which is rejected by said step (b).

20. The method as claimed in claim 19, wherein said step (c) stores in the log information including the access identifier used for the rejected access request, the caller telephone number of the rejected access request, and the date and time of the rejected access request.

21. A method of detecting unauthorized use of an identifier in a communication system which includes at least one terminal coupled to a communication center via a communication network, said method comprising the steps of:

(a) managing a password and a previous caller telephone number in correspondence with said identifier; and (b) sending a warning message to the terminal if an access identifier and an access password input from the terminal from which an access request is made respectively match said identifier and a corresponding password managed by said step (a) but a present caller telephone number from which the access request is made is different from the previous caller telephone number, wherein said step (a) further manages an access date and time of each access, and said step (b) sends at least one of the previous caller telephone number and the access date and time to the terminal when sending the warning message.

22. A method of detecting unauthorized use of an identifier in a communication system which includes at least one terminal coupled to a communication center via a communication network, said method comprising the steps of:

(a) managing a password and a previous caller telephone number in correspondence with said identifier; and (b) sending a warning message to the terminal if an access identifier and an access password input from the terminal from which an access request is made respectively match said identifier and a corresponding password managed by said step (a) but a present caller telephone number from which the access request is made is different from the previous caller telephone number, wherein said step (a) further manages second passwords in correspondence with each identifiers, and said step (b) requests input of a second access password to the terminal when sending the warning message, and rejects the access request if the second access password input from the terminal is different from a corresponding second password managed by said step (a), and wherein said step (a) further manages an access date and time of each access, and said step (b) sends at least one of the previous caller telephone number and the access date and time to the terminal when sending the warning message.

* * * * *